INVENTOR
Alda V. Bedford
BY
[signature]
ATTORNEY

INVENTOR
Alda V. Bedford
BY
ATTORNEY

Oct. 27, 1953 A. V. BEDFORD 2,657,253
COLOR TELEVISION SYSTEM
Filed Dec. 1, 1949 5 Sheets-Sheet 3
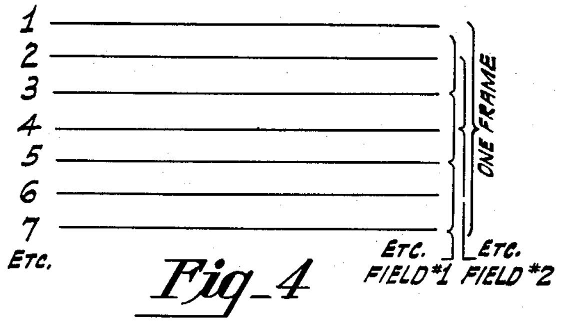
Fig_4
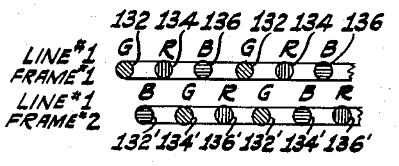
Fig_5
Fig_7
Fig_6
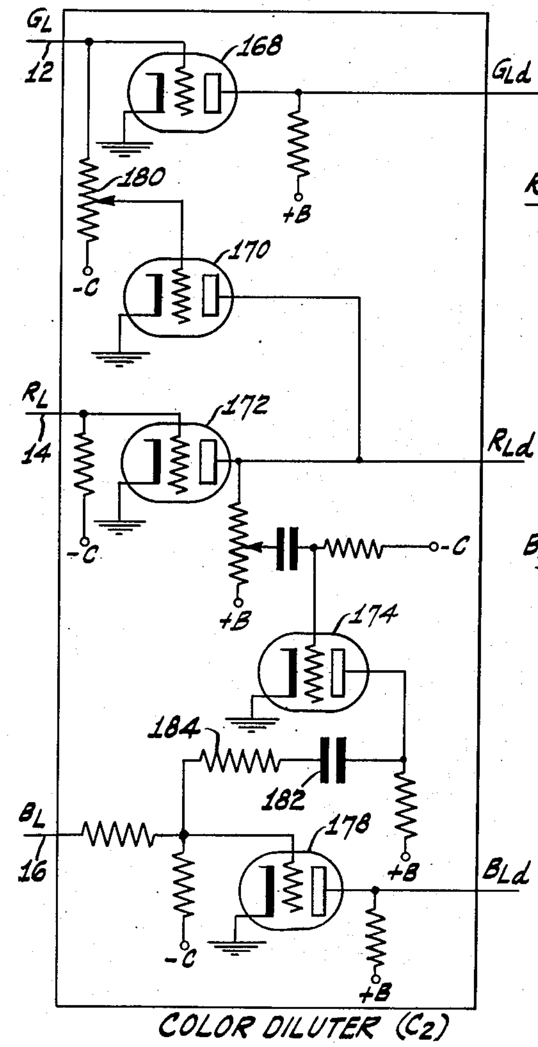
COLOR DILUTER (C2)
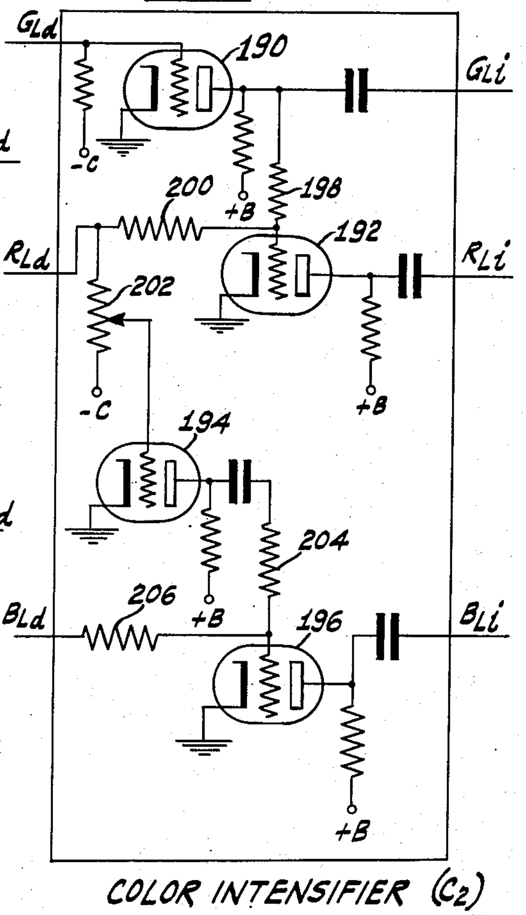
COLOR INTENSIFIER (C2)
INVENTOR
Alda V. Bedford
BY
[signature]
ATTORNEY Oct. 27, 1953 A. V. BEDFORD 2,657,253
COLOR TELEVISION SYSTEM
Filed Dec. 1, 1949 5 Sheets-Sheet 4

INVENTOR
Alda V. Bedford
BY
[signature]
ATTORNEY

Oct. 27, 1953 A. V. BEDFORD 2,657,253

COLOR TELEVISION SYSTEM

Filed Dec. 1, 1949 5 Sheets-Sheet 5

Inventor
ALDA V. BEDFORD
By
[signature]
Attorney

Patented Oct. 27, 1953 2,657,253

UNITED STATES PATENT OFFICE 2,657,253

COLOR TELEVISION SYSTEM

Alda V. Bedford, Princeton, N. J., assignor to Radio Corporation of America, a corporation of Delaware Application December 1, 1949, Serial No. 130,522

18 Claims. (Cl. 178—5.2)

The present invention relates to improvements in the methods and apparatus of time multiplexed signal communication systems and more particularly, although not necessarily exclusively, to improvements in time multiplexing methods and arrangements for transmitting and receiving time division multiplexed color television signals.

More directly, the present invention deals with improved techniques and apparatus for transmitting and receiving time division multiplexed color television signals of the general character involved in the novel color television transmission system and receiving system described in my copending U. S. patent applications, Serial No. 117,368 entitled "Color Television System," filed September 23, 1949 and Serial No. 117,618 entitled "Color Television System," filed September 24, 1949.

In more particularity the present invention is concerned with a novel time division multiplexed color television transmission and reception system which involves the use of a signal having superior compatibility with existing black and white monochrome television receivers.

There have in the past been proposed a variety of methods and arrangements for transmitting and receiving color television image information. In most of these systems, and with particular reference to the tri-color variety in which three additive primary color impressions are utilized, an effort has been extended to reduce the required bandwidth under that normally required for three separate standard black and white television channels, while retaining an effective image definition comparable to that obtainable in a black and white system. More recent considerations of the commercial aspects of color television have, however, indicated the desirability of providing a composite color television signal which when subjected to radio transmission demands a channel width not in excess of the present 6 mc. width allotted to standard black and white television transmission, including, of course, the accompanying sound. In addition, it is felt that to be acceptable the techniques of any given system of color transmission and reception must be fully compatible with existing standard black and white television receivers. That is to say, the transmitted color signal should be receivable by standard black and white receivers to produce a satisfactory panchromatic type image. Vice-versa, the color transmisison receiving techniques should be such as to provide a suitable black and white image when receiving a standard black and white television signal.

However, prior to my above-mentioned copending U. S. patent applications, it had been quite generally believed that restriction of color transmission to a 4.2 mc. video channel would demand considerable sacrifice in color picture definition. Although certain time division multiplexing arrangements had been proposed to increase apparent picture definition, no system, prior to the applicant's above-referenced arrangements, promised truly high definition color television with low bandwidth. By way of example, in the well-known basic form of time multiplexing arrangement, there is generally established at the transmitter station three separate color channels, each fed by the output of a separate color camera. Each color camera is in turn made responsive to a different one of three additively primary color components of the color image to be transmitted. A commutating or electrical sampling mechanism is then provided for sequentially sampling the individual outputs of these three color channels at some predetermined sampling rate. The output of the sampling mechanism therefore comprises a series of pulses divisible into groups of three, the amplitude variation of each pulse of a given group, of course, corresponding to the light intensity variations of the color component it represents.

The most basic color television receiving apparatus for this system is obviously the inverse of the transmitter in its operation. After the series of multiplex pulses are demodulated from the transmitter carrier, they are applied to a commutator or signal sampling circuit substantially the same as that employed in the transmitter. The receiver commutator is then held in synchronism with the transmitter commutator so that it provides at each of three separate output terminals pulses corresponding to only one particular transmitter color channel. Three receiver color channels each terminating, for example, in a kinescope, are then respectively fed by a suitable group of the separated color pulses provided by the receiver commutator. The images on the three kinescopes are given suitable color hues by the use of properly compounded phosphors or simple light filters corresponding to the three colors of the transmitter channels. The monochrome color records thus produced are then optically combined with one another to form a complete television color image.

In order to improve apparent picture quality of this basic time multiplex color system, it was proposed to provide means for reducing the image repetition rate and then horizontally interlace the primary color elements of the color image along each line of the color image raster to reduce the apparent flicker of the lower image repetition rate. With such a system, as described more fully in a copending U. S. patent application by Randall Ballard, Serial No. 117,528 entitled "Color Television System," filed September 24, 1949, the degree of visual picture detail may within limits be virtually multiplied by the number of times an individual line is interlaced. For instance, in a time multiplexed tri-color television system not employing interlacing along the lines but utilizing a channel sampling or commutating rate of 2 mc. for each color, while the bandwidth of each channel sampled is 4 mc., the effective definition of the reproduced color image for a frame presentation rate of 30 complete color frames per second, would be restricted to approximately one half the channel sampling rate. This follows since it is well known that the highest frequency capable of faithful transmission over a time multiplexed channel is equal to one half the sampling rate of that channel. If, however, the individual color elements of the tri-color system are interlaced along the horizontal lines making up the color image raster on a two-to-one basis, the effective visual definition of the color image will be increased up to the 2 mc. sampling rate while the frame presentation rate will be reduced to 15 complete color frames per second thereby decreasing the flicker rate.

In my above-referenced U. S. patent application, Serial No. 117,368, filed September 23, 1949, entitled "Color Television System," I have shown an improved method and apparatus for increasing the effective image resolution in a time multiplexed color television system such that the elemental sequential formation of the color television image will display a visual definition equivalent to color signal components having frequencies substantially above half the sampling rate of the basic time multiplexing system and substantially above the sampling rate frequency itself in multiplexed systems employing two-to-one line interlace.

In accomplishing this increase in image resolution, my above-referenced copending U. S. patent applications describe a time multiplexed color television transmission and reception system employing the division of the individual color signals of the time multiplexing system into low and high frequency components at the transmitter, the sequential sampling of the channels is then restr'cted to only the low frequency components thus provided. The remaining high frequency components of the channels are accordingly utilized to form a signal which, in the above-referenced patent applications, was termed a picture-detail signal. This picture-detail signal is then, in effect, made to by-pass the signal sampling process. By this by-passing technique, the higher signal frequencies defining the detail of the reproduced color picture or image are not deleteriously influenced by the time multiplexing sampling of the color channels. The resulting picture detail from the high frequency components of one or more of the color signal channels act to quite faithfully depict the picture detail in all of the color channels in accordance with the principles more exhaustively explained in my U. S. Patent No. 2,554,693, dated May 29, 1951, entitled "Simultaneous Multicolor Television," in which it is pointed out that the color sensitivity of the human eye is reduced when viewing the small areas of illumination defining television picture detail.

Although such a transmitted signal is highly superior to prior art color signals in that it is compatible with conventional black and white receivers to produce high definition monochromatic pictures, it is best received by a special color receiver employing similar by-passing of the picture-detail signal. Such a receiver is shown in more detail in my above-referenced application, Serial No. 117,618. Here the received and demodulated time multiplexed signal is applied to a signal distributing circuit which periodically, and in synchronism with the transmitter signal sampling mechanism, applies the incoming signals to three receiver color channels such as to apply to each of the receiver color channels only those pulses whose amplitude variations correspond to intensity variations of the color represented by the channel. The frequency of each color channel is then limited to a value well below the commutation rate of the time division multiplexed system. High frequency or picture-detail components of the received time multiplexed signal are accordingly segregated from the received signal by means of a suitable filter circuit prior to the signal distributing circuit. Then by means of one or more signal adding circuits, the high frequency picture-detail signal so selected is combined with the output of one or more of the receiver color channels. In this way, the picture-detail component of the composite time multiplexed color television signal is effectively by-passed around the receiver signal distributing system so that the commutative action of the signal distributing system cannot seriously affect the high definition detail of the color image. The reduction in dot structure thus produced allows an increase in permissible average picture brightness as well as improving the faithfulness with which picture detail is presented. Although by so by-passing the picture detail signal the so-called dot-structure in either the color or black and white version of such a signal is greatly reduced, there still remains evidence of dot structure in the reproduced image especially when transmitting and receiving large areas of uniform color.

It is therefore an object of the present invention to provide an improved method and apparatus for transmitting and receiving time multiplexed signals in electrical systems.

It is a still further object of the present invention to provide an improved method and apparatus for transmitting and receiving and reproducing color television images on a time division multiplexed basis in general accordance with my above-referenced copending U. S. patent applications, Serial No. 117,368 and Serial No 117,618.

A still further object of the present invention resides in the provision of an improved method and apparatus for reducing the relative amplitude of the component of commutation frequency in the transmitted video signal.

A still further object of the present invention is to provide a time division multiplex color signal which is particularly adapted for reception by black and white receivers.

A still further object of the present invention resides in the provision of an improved method and apparatus for reducing the visible evidence of signal commutation, normally referred to as dot-structure, in time division multiplexed color television systems.

In the realization of the above objects, the present invention contemplates the use of what will hereinafter be termed a color-diluter system which produces a predetermined intermixing or dilution of signals in at least one primary color channel by signals from one or more of the other primary color channels prior to their sampling at the transmitter. Correspondingly, at the time division color receiver and after signal distribution thereat, a corrective subtraction is made between the color channels to properly render each color channel again representative of only one primary color. This dilution system reduces the amplitude of unwanted sampling frequency component actually transmitted by the transmitter and therefore results in less visible dot structure in both black and white reproduction of the image as well as time division multiplexed color reproduction thereof.

A more complete understanding of the operation of the present invention, as well as other objects and features of advantages thereof, will be gleaned from a perusal of the following specification especially when taken in connection with the accompanying drawings in which:

Figure 4 illustrates certain aspects of a line dot-dash interlace system generally employed by the transmitter in Figure 1 and the receiver of Figure 2;

Figure 5 illustrates in further detail the dot interlace system used in the transmitter of Figure 1 and the receiver of Figure 2;

Figure 6 is a schematic representation of a particular circuit arrangement useful in the practice of the present invention in connection with the transmitter terminal arrangement of Figure 1;

Figure 7 is a schematic representation of another circuit arrangement useful in the practice of the present invention in connection with the receiver terminal of Figure 2;

Figures 1, 2:
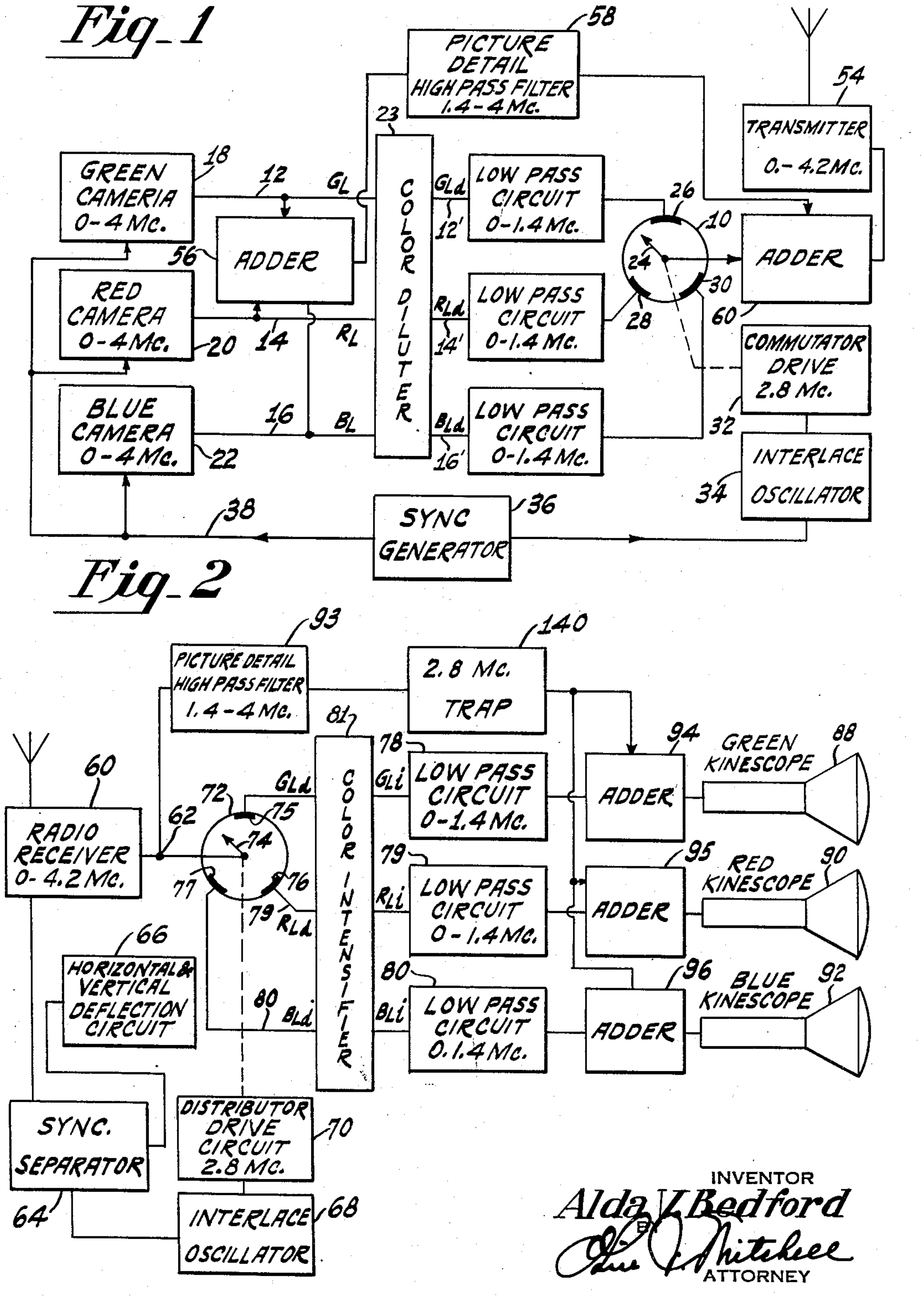
Figure 1 illustrates one form of the present invention as embodied in the transmitter terminal of my color television system shown in the above-referenced U. S. patent application, Serial No. 117,368.
Figure 2 illustrates an embodiment of the present invention as applied to the color receiver terminal of my color television system shown and described in the above-referenced U. S. patent application, Serial No. 117,618.

Before considering the novel aspects of the present invention in full detail, an understanding of the basic nature of the television signal with which the receiving and transmitting apparatus of the present invention is primarily concerned. is best obtained. For this purpose, the embodiment of the present invention shown in Figure 1 involves the novel time division multiplexing color television system described in my above-referenced U. S. patent application, Serial No. 117,368. In this system, there is provided a signal sampling or commutating device represented by the symbol 10, well known to those skilled in the art, adapted for sequentially sampling the output of three color signal channels 12, 14 and 16 respectively fed by the outputs of a green, red, and blue color camera 18, 20, and 22.

It is noted that each of the channels 12, 14 and 16 from the color cameras to the sampler 10 is shown interrrupted by the diluter circuit 23 whose function relates solely to the present invention as hereinbefore described. Since the details and operation of this diluter circuit form the subject of the present invention, they will hereinafter be treated in full detail.

However, for the present discussion dealing with the general character of the overall basic time multiplex system to which the present invention relates, it shall be assumed that the color diluter circuit is not in operation and that each of the channels 12, 14 and 16 are continuous and uninterrupted so that it may be taken that path 12 is directly connected with only 12′, path 14 connected with only 14′ and path 16 with 16′.

Accordingly, the sampling device 10 is symbolically shown as provided with a rotating armature 24 which, as it rotates, electrically contacts the terminals 26, 28, and 30, each bearing respective signals from the green, red, and blue camera channels. The frequency at which the commutation or sampling of the color cameras takes place is determined by the commutator drive circuit 32. The drive circuit 32 is in turn, through the agency of an interlacing oscillator 34, whose function will be later described, synchronously controlled by the television system sync generator 36 in order to hold all elements of the television system in synchronism with one another. The sync generator 36 is further adapted via path 38 to apply synchronous control to the red, blue and green cameras 18, 20, and 22. By way of example, the commutator drive circuit has been indicated as effecting a sampling rate of 2.8 mc. for each color. This sampling or commutation rate is not in any way critical but may assume a variety of values, that which is indicated being illustrative of only one value permissibly employed.

Figure 3:
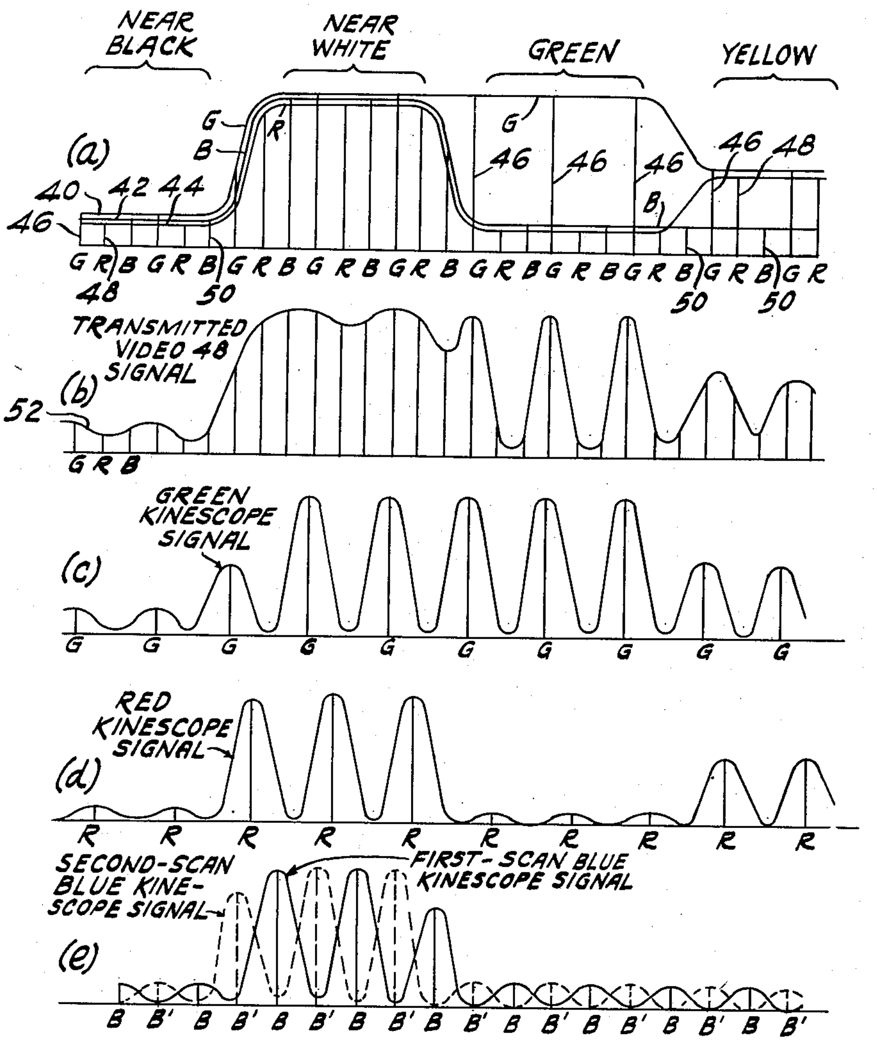
Figure 3 illustrates certain waveform characteristics of the television signal transmitted by the basic system of Figure 1.

Assuming then the appearance of green, red, and blue color signals at the terminals 26, 28, and 30 of the sampling device 10, the output available at the armature 24 will comprise a plurality of pulses having a recurrence frequency of three times that of the 2.8 mc. sampling rate or 8.4 mc. In Figure 3*a*, there are illustrated by the curves 40, 42, and 44 respectively, the video signals appearing at the terminals 26, 28, and 30 of the commutator 10 under the conditions of a camera pick up of a near black color area, a near white color area, a green color area, and a yellow color area as scanned by the green, red, and blue cameras 18, 20, and 22. The commutator armature 24 will then sequentially sample the signals appearing at the terminals 26, 28, and 30 during the intervals corresponding to the pulses 46, 48, and 50, which sampling provides pulsed color information at those output terminals of the commutator corresponding to the green, red, and blue channels.

The amplitude of the pulses delivered by the commutator will therefore be defined by the actual amplitude of the signal appearing at the terminal being sampled. For sake of convenience in Figure 3a, all of the green sampling pulses 46, whose peak amplitude is defined by the green signal 40 applied to terminal 26 of the commutator, is designated by the letter G. The red and blue pulses 48 and 50, whose amplitude is defined by the signal curves 42 and 44 respectively, are correspondingly designated as R and B pulses. Thus, for near black signals all of the green, red and blue components, as shown, will have a very low amplitude so that the amplitudes of G, R, and B sampling pulses will be correspondingly low. The curve in Figure 3b illustrates the actual appearance of the sampling pulses at the output of the commutator 10. The curve 52 of Figure 3b, connecting the peaks of the green, red, and blue pulses, of course, indicates the envelope of the transmitted video signal. For a near white signal where the green, red, and blue components are relatively high, all of the green, red, and blue sampling pulses will, of course, increase proportionately. For a green signal, the amplitude of the red and blue components will drop considerably to leave a preponderance of high amplitude green pulses 46. Correspondingly, for a yellow signal, the amplitude of the blue sampling pulses 50 will drop leaving a preponderance of green and red pulses 46 and 48 respectively. The waveform in Figure 3b defined by these pulses will form the basic signal transmitted by the transmitter 54. However, according to the novel transmitter arrangement shown in Figure 1, described in my above-referenced U. S. Patent application, Serial No. 117,368, entitled "Color Television System," filed September 23, 1949, the outputs of a plurality of the color cameras, and in the case of the present Figure 1 all of the color cameras, are applied to an adder circuit 56 which additively combines at least two of the color signals together and applies them to a picture-detail high-pass circuit 58. The output of the picture-detail high-pass circuit 58 is then added to the modulating signal applied to the transmitter 54 from the commutator 10 by means of the adder circuit 60. As described in the last referenced case, the adder circuit may be eliminated altogether and the green channel signal alone applied to the picture-detail high-pass filter.

As pointed out hereinabove, this transmitter arrangement allows the high-frequency components of the color image to by-pass the commutator 10 thereby obviating the production of any deleterious signal components produced through a heterodyne between the sampling rate of the commutator 32 and the higher frequency components of the color signals. Correspondingly, the color channels 12, 14, and 16 are given low-pass characteristics whose highest pass frequency is approximately equal to the lowest pass frequency of the picture-detail high-pass circuit. Since it is well known that the pulse rate of a time division multiplexed channel should, if cross-talk is to be surely avoided, not be greater than twice the bandwidth of the communication channel, it is evident that the sampling rate of the commutator 10 must necessarily be held to ⅓×2×4.2 mc.=2.8 mc., where 4.2 mc. is the upper limit of the video bandpass provided by the transmitter 54. Since it is further well known in the electrical art that the highest frequency faithfully reproducable over a given channel of a simple time division multiplexing system is not in excess of one-half the frequency at which that given channel is sampled, there is no need for extending the pass characteristics of the channels 12, 14, and 16 beyond half the established 2.8 mc. sampling rate or 1.4 mc. This therefore determines that the picture-detail high-pass circuit 58 may pass signals falling in the range of 1.4 mc. to 4.2 mc., the upper limit of this band being in turn defined by the upper limit of the transmitter pass band which, as hereinbefore brought out, is conventionally established at 4.2 mc. With the arrangement shown, the modulation envelope of the transmitted video signal will therefore appear substantially as shown in Figure 3b by curve 52 with, of course, the exception that the high-frequency picture-detail signal will be transmitted at all times regardless of the commutation action of the commutator 10. For ease and clarity in illustration, this high-frequency picture component has not been graphically represented.

In Figure 2, there is shown a receiving system for receiving the transmitted signal of the transmitter in Figure 1. In accordance with prior art proposals, a conventional radio receiver 60 is provided for receiving and demodulating the transmitted color television carrier. The demodulated video signal, which will be substantially the same as the curve shown in Figure 3b, will therefore appear at the output terminal 62 of the receiver 60. A conventional sync separator circuit 64, kinescope deflection circuit 66, as well as an interlace oscillator 68, and drive circuit 70 for the receiver commutator 72, are also provided for operation from the output derived from the receiver 60. In further accordance with prior art proposals, the commutator 72 symbolically represents a signal distributing system substantially the same as the sampling arrangement 10 in Figure 1 and is indicated as having a contactor or armature 74 which rotatingly and successively contacts the terminals 75, 76, and 77. The rotation of the armature 74, through the action of the commutator drive circuit 70 and interlace oscillator 68, the oscillator being in turn controlled by the output of the sync separator 64, is held in exact isochronism with the armature 74 of the commutator 10 in Figure 1. Thus, when a green pulse is being commutated for transmission by the commutator 10 in Figure 1, the armature 74 will be in position for distribution of this pulse to the terminal 75 of the receiver commutator 72. Likewise, the red and blue pulses will be distributed to the terminals 76 and 77 of the receiver commutator 72.

According to the arrangement described in my above-identified U. S. Patent application, Serial No. 117,618, however, the outputs of the commutative distributor 72 appearing at its terminals 75, 76, and 77 are, via paths 78, 79 and 80, respectively applied to low-pass signal circuits 82, 84, and 86 whose cutoff frequency is made identical to the cutoff frequency of the low-pass circuits 12, 14, and 16 of the transmitter. This prevents high-frequency signal components from being directly communicated by these respective green, red and blue low-pass circuits to the green, red and blue image reproducing tubes or kinescopes 88, 90, and 92. It will again be noted that in accordance with the present invention, each of the circuit paths 78, 79, and 80 from the commutative distributor 72 is interrupted by a color intensifier circuit briefly described hereinbefore. As in the case of the color diluter of Figure 1, detailed consideration of the intensifier will be given hereinafter and for the purposes of the present discussion of the general basic system with which the present invention is related, the intensifier circuit will be regarded as of no effect. Thus, paths 78, 79, and 80 may be assumed directly and individually connected only with paths 78', 79' and 80' until otherwise indicated.

Accordingly, the high-frequency picture-detail signal transmitted by the transmitter in Figure 1 is in further accord with U. S. Patent application, Serial No. 117,618, supra, selected at the output of the receiver 60 by the picture-detail high-pass filter circuit 93 whose output may be combined with one or more of the receiver color channels 78, 79, and 80. Although in Figure 2 the output of the picture-detail high-pass filter 94 is shown to be added to all of the color channels by means of adder circuits 94, 95 and 96, it is clear that picture-detail addition may be confined only to a single channel such as the green channel 78. As in the case of the transmitter in Figure 1, the picture-detail high-pass circuit is given a bandpass characteristic whose lower frequency limit begins at the upper frequency cutoff of the individual green, red and blue color channels. The upper frequency cutoff of the detail high pass circuit 93, of course, need be no greater than the 4.2 mc. bandwidth of the transmitter 54.

As pointed out in my above-referenced U. S. patent application, Serial No. 117,618, filed September 24, 1949, this novel bypassing of the picture-detail components of the various color channels around the sampling or distributing agency in the color television transmitter-receiver system acts to reduce dot structure in the received image as well as providing a considerable increase in the light level permissibly obtained from the reproducing kinescopes without losing image or picture-detail due to electron beam blooming in the kinescopes. These benefits naturally follow since there is by merit of the picture-detail bypassing scheme at the transmitter, no commutative 2.8 mc. breakup of the high-frequency picture elements by the commutator 10. Thus, at the output of the receiver commutative distributor 72, which tends to produce a 2.8 mc. commutative component, the restricted 1.4 mc. bandwidth of the low-pass circuits 78, 79 and 80 act to prevent this component from producing a visible dot pattern in the reproduced image.

As even further pointed out in my copending U. S. patent application, Serial No. 117,618, filed September 24, 1949 supra, it appears that inasmuch as the incoming high-frequency components in the receiver of Figure 2 are actually applied to the commutator 72, there will exist conditions permitting the heterodyning of these high-frequency components with commutating frequency of the commutator thereby to produce false low-frequency distortion components. The effects of these components may be visually cancelled to a large extent and rendered of nil effect if a suitable type of horizontal interlacing system image transmitter and receiver is employed. Although horizontal interlace has, as hereinbefore described, been previously employed to increase the effective definition in the image at the expense of a lower frame presentation rate, it is apparent that with the bypassing system described, the highest possible picture-detail is already provided since the picture-detail frequencies are not caused to undergo commutation.

An exemplary form of horizontal interlacing systems suitable for reducing the visual effects of any distortion components produced by the above-described heterodyning action is shown in full detail in the U. S. Patent application by Randall C. Ballard, Serial No. 117,528, filed September 24, 1949, entitled "Color Television System." However, for immediate understanding of the general manner in which these distortion components are visually cancelled, there is illustrated in Figure 4, a two-dimensional form of kinescope raster produced by an accepted standard of vertical interlacing, namely, lines 1, 3, 5, 7, etc. are laid down on the kinescopes 88, 90, and 92 by the first field or vertical scansions of the kinescopes, whereas lines 2, 4, 6, and 8, etc. will be laid down by the second field or vertical scansion of the kinescopes. To illustrate one form of permissible line interval interlace, Figure 5 indicates the manner in which line 1 of the raster of Figure 4 is scanned over two successive frame intervals. During the first frame and at the beginning of the field 1 of that frame, line 1 is scanned simultaneously in all of the green, red, and blue kinescopes 88, 90, and 92. Hence, considering Figure 5 as a time plot of the sampling intervals comprising line 1 of frame 1 as produced in the receiver 60 of Figure 2, the line is made up of green picture element intervals 132, red picture element intervals 134 and the blue picture element intervals 136. As shown, the individual picture or image element intervals are separated by spaces substantially equal to the duration of a color interval. It is noted that for convenience, the elemental intervals making up the line are shown as circular but, in fact, it is manifest that they would have no real geometric form.

The second time line 1 is scanned which, of course, occurs to the beginning of frame 2, shown in the lower sequence of intervals 132', 134', and 136' and, as described more fully in the above-referenced U. S. Patent application by Randall Ballard, the phase of the commutator 10 in the transmitter of Figure 1 and the commutator 72 in the receiver of Figure 2 has been shifted through the simultaneous action of the interlacing oscillators 36 and 68 in the transmitter and receiver respectively. This interlacing oscillator operates at approximately one-half line frequency and accomplishes a shift of virtually 180° so that the color intervals of the second scansion of line 1 at the beginning of frame 2 (shown at the bottom of Figure 5) will occur during the spaces between the color intervals set forth along line 1 at the beginning of frame 1 (shown in the upper portion of Figure 5). It is then found that the distortion components produced by the heterodyning action described above tend to occur on either side of the color picture intervals so that interpositioning of the interlaced elements provide partial cancellation of the lower frequency disturbance. The phase of such low-frequency disturbances can in turn be shown to allow this effect to take place to a degree permitting considerable reduction of any visual interference produced by these false low-frequency components.

Although highly satisfactory color television images are reliably produceable by the basic system so far described, and although the brightness and clarity of the color television images so produced are superior to certain other prior art systems, and although the dot structure due to the time multiplex transmission sampling involved in the system is low, there still remains room for measurable improvement.

For example, by reference to curve 52 of Figure 3b of the drawings it can be seen that during the transmission of signal information corresponding to large areas of uniform color, the transmitted video signal contains a rather measurable amplitude of sampling frequency component. More particularly, consider the transmitted video signal 52 during the transmission of the green area indicated in Figure 3*a*. This sampling frequency component being defined by the envelope of the transmitted video signal will then appear at the output of the radio receiver 60 and will be applied to the picture-detail high-pass filter 93. Since the high-pass filter has a response at the 2.8 mc. sampling rate, this component would during the transmission of this color area tend to produce a very prominent dot pattern in the reproduced color image. As pointed out in my above-referenced copending patent applications, the prominence of the dot pattern so produced may be greatly reduced through the use of a trap circuit such as shown at 140 which acts to reject the undesirable 2.8 mc. component. However, the use of the trap 140 is not altogether desirable due to considerations of expense as well as the undesirable phase shifting the trap may impose upon signal components having frequencies immediately adjacent the 2.8 mc. sampling rate. More particularly, is this 2.8 mc. component undesirable when the transmitted video signal is received by an ordinarily black and white receiver in which there is not normally provided a special trap for the sampling frequency.

Thus, according to the present invention, means are provided for reducing the amplitude of the sampling frequency component of the intermediate video signal during the transmission of signal information corresponding to large color areas. By reducing this component, the transmitted signal becomes much more compatible with black and white receivers as well as reducing the degree of required sampling frequency attenuation in regular color television receivers. This reduction of sampling frequency component is, as is hereinabove described, accomplished by the present invention through the use of a color diluter system which produces a predetermined intermixing or dilution of signals in one primary color channel by signals from one or more of the other primary color channels prior to their sampling at the transmitter. That is to say, referring now to Figure 1, the color diluter circuit 23 acts to take the signals $G_L$, $R_L$, $B_L$ respectively representing the low-frequency components of the green, red, and blue primary color channels and intermixes them together so that the respective output channels $G_{Ld}$, $R_{Ld}$, and $B_{Ld}$ of the diluter will have predetermined percentages of low-frequency color components other than the particular green, red or blue channel that they would ordinarily represent. This may be best expressed by the following set of equations:

$$\begin{aligned} G_{Ld} &= K_1G_L+(K_2R_L+K_3B_L) \\ R_{Ld} &= K_4R_L+(K_5G_L+K_6B_L) \\ B_{Ld} &= K_7G_L+(K_8G_L+K_9B_L) \end{aligned} \qquad (1)$$

where $G_{Ld}$, $R_{Ld}$, and $B_{Ld}$ respectively represent, as heretofore stated, signal conditions of each diluted color channel and $K_1$, $K_2$, $K_3$, $K_4$, $K_5$, $K_6$, $K_7$, $K_8$, and $K_9$ are proportionality constants which may assume any set of suitable values. This will then tend to make the signals appearing at terminals 26, 28, and 30 of the transmitter sampler 10 more uniform in amplitude for any given set of color conditions. Thus, being more uniform the transmitted video signal of Figure 3*b* will correspond more closely to those conditions obtained during the transmission of a near white signal; that is, there will be less amplitude of sampling frequency component. Accordingly, by this signal dilution a black and white television receiver will give less evidence of dot structure corresponding to the sampling action of the transmitter sampler.

Any mode of signal dilution may, in accordance with the above expressions at (1), be employed to accomplish the operational mode of and advantages of the present invention. However, inasmuch as the diluted transmitted video signal must be corrected or intensified at the color receiver itself in order to produce faithful color television pictures, the exact schedule or manner of dilution at the transmitter should be chosen with a view to accomplishing the intensification at the receiver with the highest degree of simplicity. It is evident that any form of dilution at the transmitter, since it comprises merely the addition of one signal with another, may be corrected at the receiver by a suitable subtractive, additive or dividing networks which, in effect, provide a solution to the above set of simultaneous equations given at (1).

Figure 10:
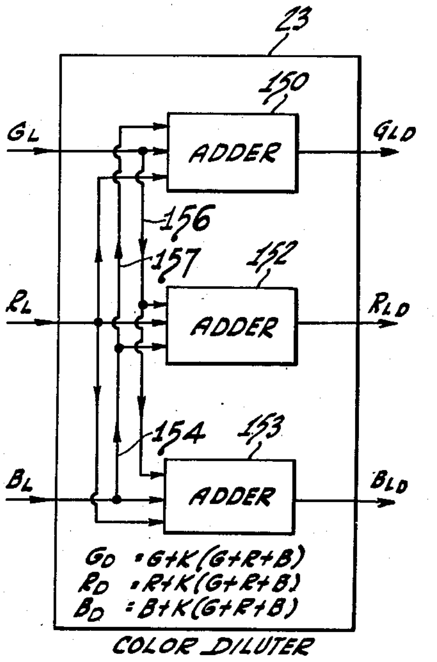
Figure 10 is a block diagram representation of another suitable circuit arrangement useful in the transmitter embodiment of the present invention shown in Figure 1; and, Figure 11 is a block diagram representation of a suitable circuit arrangement useful in the receiver embodiment of the present invention as illustrated in Figure 2.

In this respect, if the above general case of signal dilution is confined to the following expressions:

$$\begin{aligned} G_{Ld} &= G+K(G+R+B) \\ R_{Ld} &= R+K(G+R+B) \\ B_{Ld} &= B+K(G+R+B) \end{aligned} \qquad (2)$$

where $G_{Ld}$, $R_{Ld}$, and $B_{Ld}$ again respectively represent signal conditions of each diluted color channel and the proportionality constant K is given any desirable value which, in most instances, may be less than 2, the circuitry required for signal intensification at the receiver becomes greatly simplified. This may be seen by reference to Figures 10 and 11 in the drawings where the Figure 10 comprises a color diluter arrangement suitable for use as a color diluter in Figure 1 and employs simple algebraic adder circuits 150, 152 and 153. These adder circuits may be either electronic or resistive and as will be apparent to any one skilled in the art, may be arranged to accomplish the dilution expressed by the equations given at (2) above. By means of circuit path 154, $B_L$ signal is added to $R_L$ signal in adder 152. By circuit path 156, $G_L$ signal is added to $R_L$ signal in the same adder 152. Correspondingly, by circuit paths 154 and 157, $B_L$ signal is added to $G_L$ signal in adder 150. This adding technique is self-evident and is not believed to require further description. However, if the dilution is carried out in accordance with the expressions (2) above, the corrective network or color intensifier circuit 81 in the receiver of Figure 2 may take the form shown in Figure 11.

Figure 11:
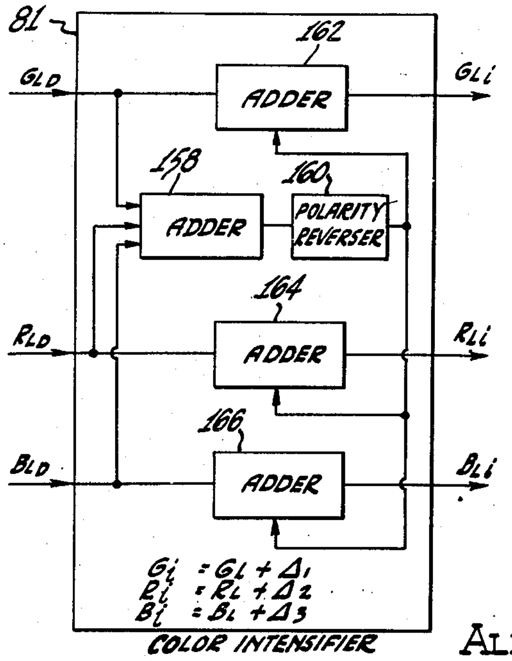

Here, in Figure 11, the diluted signals, $G_{Ld}$, $R_{Ld}$ and $B_{Ld}$ as demodulated by the receiver 60 and distributed by the distributor 72 are applied to an adder circuit 158, whose output is reversed in phase by the polarity reverser 160. The showing of this polarity reversal is to indicate that the output signals from the adder 158 are to be subtractively combined with the $G_{Ld}$, $R_{Ld}$ and $B_{Ld}$ signals by means of the adder circuits 162, 164 and 166. The output of the adder circuit will then represent a signal $$G_{Ld}+R_{Ld}+B_{Ld}=(1+3K)\ (G_L+R_L+B_L) \qquad (3)$$

Thus, if the amplitude of the signal appearing at the output of the phase reverser 160 is adjusted so that it is in absolute value equal to $$\frac{K}{1+3K}$$

of the amplitude of the particular $G_{Ld}$, $R_{Ld}$ and $B_{Ld}$ signals appearing in each of the channels, there will appear at the output of the adder circuits 162, 164 and 166 an intensified signal which substantially represents the original color signals $G_L$, $R_L$ and $B_L$ applied to the diluter circuit of the transmitter in Figure 1. These intensified signals appearing at the output of the color intensifier $G_{Li}$, $R_{Li}$ and $B_{Li}$ appearing at the output of the color intensifier, of course, contain certain spurious components respectively designatable by $\Delta_1$, $\Delta_2$ and $\Delta_3$ which, depending upon the accuracy with which subtraction is accomplished and other circuit balance may be made insignificantly small. Furthermore, as in the case of the false low frequency components caused by heterodyning action in the receiver commutator described hereinbefore, these components may tend to undergo visual cancellation by the dot interlace system also described hereinbefore. In the practice of the present invention it is found that good performance is obtained when the constant K assumes the exemplary values of ¼, ⅓ or ½ in the above expressions at (2).

Another desirable mode of color dilution is expressible by the equations $$\begin{aligned} G_{Ld} &= G_L \\ R_{Ld} &= K_1R + K_1G \\ B_{Ld} &= K_2B + K_2R + K_2G \end{aligned} \qquad (4)$$

wherein as before $G_{Ld}$, $R_{Ld}$ and $B_{Ld}$ respectively represent signal conditions of each diluted color channel at the transmitter and $K_1$ and $K_2$ are proportionality constants. With such a dilution schedule, it is seen that the received $G_{Ld}$ signal applied to the input of the diluter 81 in the receiver is truly an undiluted green channel representation and may be applied directly to the input low pass circuit 78. However, in order to instensify $R_{Ld}$, it will be necessary to subtract therefrom the signal $G_{Ld}$ thereby to render $R_{Li}$ which but for a small distortion component will then represent true red channel information. Correspondingly, it is only necessary to subtract $R_{Ld}$ from $B_{Ld}$ in order to obtain the $B_{Li}$ signal for input to the low pass circuit 80. Suitable circuitry for accomplishing this color dilution and color intensification schedule are respectively shown, purely by way of example, in Figures 6 and 7 of the drawings.

In Figure 6 the color diluter for application at the transmitter terminal of the system is provided with vacuum tubes 168, 170, 172, 174 and 176 which are connected in conjunction with simple additive resistive type circuits. For example, and in accordance with the equations of (4) above, the $G_L$ signal is directly communicated by the tube 168 to become a $G_{Ld}$ signal applied to circuit path 12'. $R_L$ signal coming into the color diluter via circuit path 14 is applied in the input of discharge tube 172 and by means of discharge tube 170, a certain amount of $G_L$ signal is mixed with the $R_L$ signal in the anode circuit of the discharge tube 172. By adjusting the potentiometer 180, the constant $K_L$ may be established for $G_L$ component. Accordingly, the $B_L$ signal representing blue low frequencies applied to the color diluter circuit via channel 16 is applied to the input of the discharge tube 178. However, there is also applied to the input of discharge tube 178 some $R_L$ and $G_L$ signals via the discharge tube 174 and coupling capacitor 182 and resistor 184.

The color intensifier circuit in the receiver may assume a correspondingly simple form as shown in Figure 7 and may comprise four discharge tubes such as 190, 192, 194 and 196, whose inputs are respectively supplied with $G_{Ld}$, $R_{Ld}$ and $B_{Ld}$ signals. However, in accordance with the required subtractive intensification method set forth above, a $G_{Ld}$ signal may be used directly for green channel information and considered to be $G_{Li}$ itself. This is accomplished by discharge tube 190. However, to arrive at $R_{Li}$ we must subtract some $G_{Ld}$ from $R_{Ld}$. This is, of course, accomplished by resistors 198 and 200, respectively, communicating $G_{Ld}$ and $R_{Ld}$ information to the grid of discharge tube 192, the phase of these informations being 180 degrees out; therefore to allow subtractive combining thereof. Correspondingly, to obtain the $B_{Li}$ we must subtract a certain amount of $R_{Ld}$ from $B_{Ld}$ and this is seen to be accomplished by discharge tube 194 reeciving at its output $R_{Ld}$ signal from the potentiometer 202. Subtraction of $R_{Ld}$ from $B_{Ld}$ is then accomplished at the common terminal of resistors 204 and 206, respectively communicating at 180 degrees out-of-phase with one another, $R_{Ld}$ information and $B_{Ld}$ information for application to the discharge tube 196.

If, solely by way of example, constants $K_1$ and $K_2$ in the expressions at (4) are respectively made at ½ and ⅓ it will be seen that overall video signal transmitted by the transmitter in Figure 1 will be made up of:

$$\text{Total signal}—1\tfrac{5}{6}G_L+\tfrac{5}{6}R_L+\tfrac{1}{3}B_L \qquad (5)$$

It can then be seen that under such conditions the normal red signal $R_L$ is 50 percent diluted by the green and the blue signal $B_L$ is diluted 33⅓ percent by the red and also 33⅓ by the green. The green remains undiluted. This preponderance of the green signal information as evidenced by Equation 5 tends to improve the monochromatic reproduction of the video signal on black and white receivers since experience has shown that a video signal having excessive green component representation produces a more pleasing panchromatic type picture than that produced by a signal having equal representations of all three color components.

Figure 8:
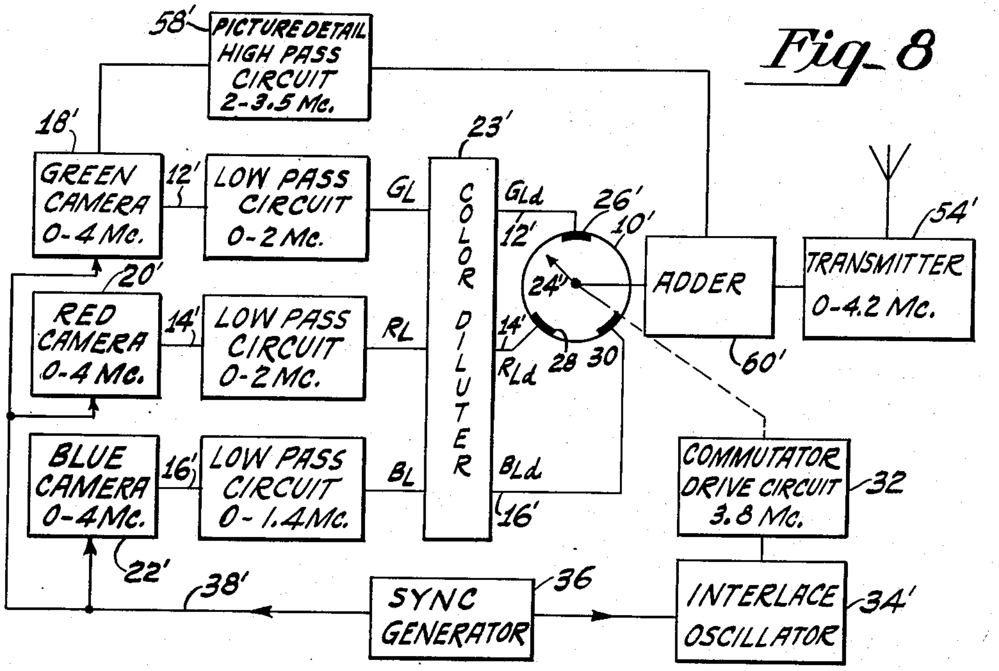
Figure 8 is a still further embodiment of the present invention as applied to a transmitter terminal arrangement adapted for operation at a slightly higher sampling rate than the mechanism of Figure 1.
Figure 9:
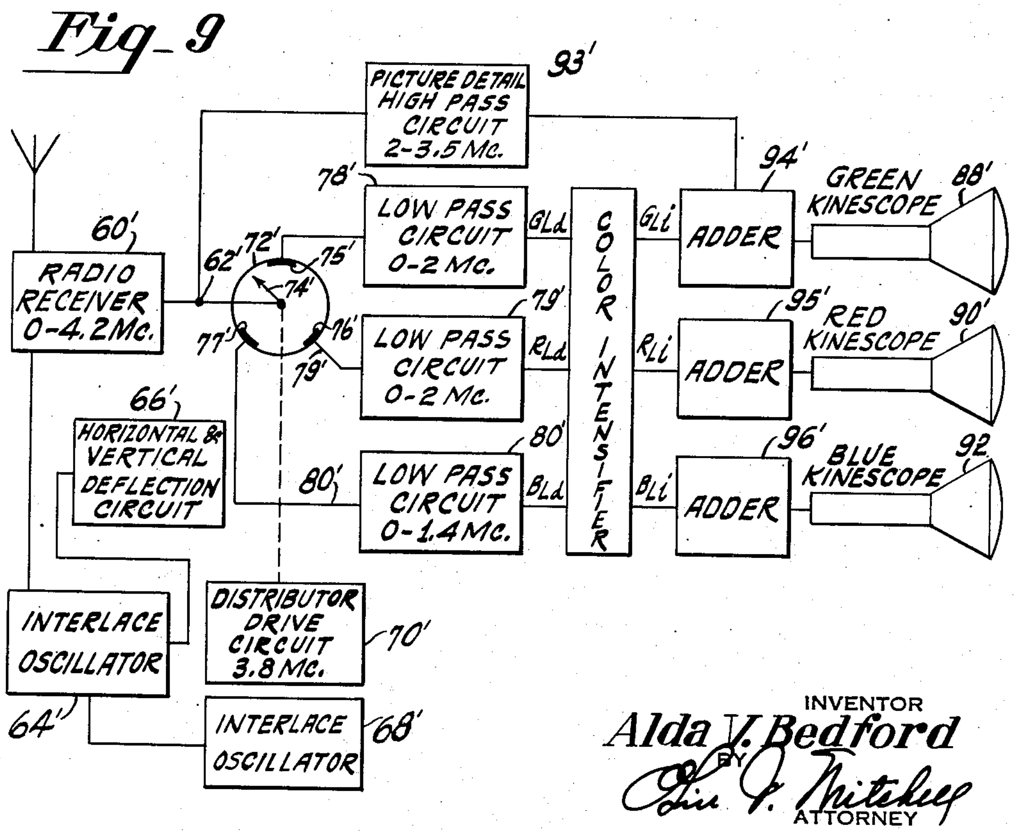
Figure 9 is an embodiment of the present invention as applied to a color television receiver terminal of a type substantially as shown in Figure 2 but of a slightly higher commutation rate.

The arrangements of Figures 8 and 9 are substantially the same as the arrangements of Figures 1 and 2 and the considerations given hereinbefore as to the variety of modes in which the color diluter and color intensifier circuits may perform and be constructed fully apply. However, in Figures 8 and 9 respectively representing the transmitter and receiving terminals of a complete color system, a higher commutator and distributor rate is utilized at the transmitter and receiver. Here, as shown, the rate is increased to 3.8 mc. This, therefore, places the commutative dot pattern producing components of the video signal outside the range of the picture-detail high-pass circuit 93' in Figure 9, and therefore, a special trap is no longer required to further reduce the dot pattern producing components of the signal. It will also be noted that the low-pass circuits for both the transmitter and receivers have a frequency response characteristic which is extended to 2 mc. in the case of the green and red channels. This is permissible since the higher sampling rate of 3.8 mc. will permit faithful reproduction of higher frequency components of the time multiplexed signal. In other respects the circuits of Figures 8 and 9 are structurally identical to the respective receiver and transmitter circuits of Figures 1 and 2 and like component parts have been assigned similar reference numerals followed by a prime designation.

From the foregoing, it can be seen that the present invention has provided a novel method and apparatus for reducing the commutative components of multiplexed signals in general and, in more particularity, when applied to time multiplexed color television systems greatly reduces the visible dot pattern produced by such commutative components. It is to be understood that whereas certain additive and subtractive circuit arrangements have been shown in connection with the embodiments illustrated hereinbefore that the present invention itself is in no way limited thereby. Furthermore, although the embodiments herein illustrating the present invention have employed the by-passing of high frequency components around the commutator of both the transmitter and receiver terminals, the utility of the present invention is not restricted to such circuit techniques.

For example, in the application of the present invention to a basic type of time division multiplex color television system not employing my by-passed highs technique, each of the color channels would be given a broader bandpass than that indicated in Figures 1 and 2. With such a basic arrangement, the picture-detail high-pass filters 58 and 93 in the receiver and transmitter respectively would be eliminated and the low-pass circuits in channels 12′, 14′ and 16′ and those at 78, 79 and 80 would be given an extended pass characteristic up to several megacycles or more. Thus, the by-passing circuit for the commutator in both Figures 1 and 2 would be eliminated and the invention would then be seen to be applicable to basic form of time division multiplex color television transmission and reception.

Having thus described my invention, what I claim is:

1. In a time division multiplexed transmission system adapted for multiplexed transmission of a plurality of intelligence channels over a single communication channel by means of periodic electrical sampling of the outputs of said intelligence channels at a predetermined sampling rate, a suppression arrangement for minimizing the amplitude of sampling rate signal component appearing in said communication channel said suppression arrangement comprising in combination, means for extracting predetermined amplitudes of intelligence signal from at least one of said intelligence channels to form dilution signals, means for impregnating, according to a fixed dilution schedule, discrete levels of dilution signals into at least one other intelligence channel whereby the output of at least one intelligence channel represents signal intelligence from a plurality of intelligence channels, and a time multiplex signal sampling mechanism having its inputs coupled to the outputs of said intelligence channels and its output coupled with said communication channel.

2. In a time division multiplexed reception system adapted to receive and time distribute a composite multiplex signal to a plurality of intelligence channels at a distribution rate corresponding to the sampling rate represented by said composite signal, a sampling component suppression circuit comprising in combination, means for time multiplex distribution of the received multiplex signal to a plurality of intelligence channel inputs, means for extracting predetermined amplitudes of signal intelligence from at least one intelligence channel to form intensifying signals, and means for impregnating, according to a fixed intensifying schedule, discrete levels of intensifying signals into at least one other intelligence channel.

3. In a time division multiplexed transmission and receiving system involving the periodic sampling at a predetermined rate of a plurality of intelligence signal channels, to form a composite multiplex signal subsequently to be received and time distributed to a plurality of receiving channels corresponding in character to said intelligence signal channels, a balancing arrangement for minimizing the amplitude of sampling rate signal component appearing in said composite multiplexed signal and applied to said plurality of receiving channels comprising in combination, means for extracting predetermined amplitudes of intelligence signal from at least one of said intelligence signals to form dilution signals, means for impregnating, according to a fixed dilution schedule, discrete levels of dilution signals into at least one other intelligence signal whereby the output of at least one intelligence signal represents signal intelligence from a plurality of intelligence signals, a time multiplexed signal sampling mechanism having its input coupled with the outputs of said intelligence channels, a time multiplexed distribution mechanism for periodically distributing multiplexed signal to a plurality of receiving channels, means for applying the output of said signal sampling mechanism with the input of said time multiplexed distribution mechanism, means for extracting predetermined amplitudes of signal intelligence from at least one receiving channel to form intensifying signals, and means for impregnating, according to a fixed intensifying schedule, discrete levels of dilution signals into at least one receiving channel other than the one from which said intensifying signals have been extracted.

4. In a time division multiplexed color television transmission and receiving system establishing a periodic sampling at a predetermined rate of a plurality of primary color image signals to form a composite multiplexed signal designated for subsequent time distribution to a plurality of reproducing color channels respectively corresponding to the color information of said primary color image signals, a balancing arrangement for reducing the visible image dot structure attributable to composite signal components corresponding to said periodic sampling process, said balancing arangement comprising in combination, means for diluting, according to a given diluting schedule, at least one of said color image signals with a discrete amount of signal information extracted from at least one other of the color image signals, a time multiplexed sampling mechanism, means for applying the output of said diluting means to the input of said time multiplexed sampling means, a time multiplexed dividing mechanism having its input coupled with the output of said sampling mechanism, said time multiplexed dividing mechanism being adapted to form from the output of said sampling mechanism a plurality of reproducing color channels, at least one of which embraces said additively diluted signals, means for extracting predetermined amplitudes of signal intelligence from at least one reproducing color channel to form intensifying signals, and means for combining with the output of each additively diluted reproducing color channel discrete amounts of said intensifying signals, according to a schedule which is complementary to said additively diluting schedule, to intensify and purify each diluted reproducing color channel.

5. Apparatus according to claim 4 wherein said color television system is of the three primary color channel variety utilizing green, red, and blue color channels each carrying video signals having an amplitude representable by the symbols G, R and B, and wherein the additive diluting schedule is expressable by the equations:

$$G_d = G + K(G+R+B)$$
$$R_d = R + K(G+R+B)$$
$$B_d = B + K(G+R+B)$$

wherein $G_d$, $R_d$ and $B_d$ respectively represent signal conditions of each diluted color channel, and K is some proportionality constant less than two.

6. Apparatus according to claim 4 wherein said complementary subtractive combining means comprises means for adding all reproducing color channel signals to form an intensifying signal and means for subtracting $$\frac{K}{1+3K}$$

times the amplitude of said intensifying signal from each of the reproducing color channel signals.

7. Apparatus according to claim 4 wherein said color television system is of the three primary color channel variety utilizing green, red, and blue color channels each carrying video signals having an amplitude representable by the symbols G, R and B, and wherein the additive diluting schedule is expressable by the following simultaneous equations:

$$G_d = K_1 G + (K_2 R + K_3 B)$$
$$R_d = K_4 R + (K_5 G + K_6 B)$$
$$B_d = K_7 G + (K_8 G + K_9 R)$$

where $G_d$, $R_d$ and $B_d$ respectively represent signal conditions of each diluted color channel and $K_1$, $K_2$, $K_3$, $K_4$, $K_5$, $K_6$, $K_7$, $K_8$, and $K_9$ are proportionality constants.

8. Apparatus according to claim 7 wherein said complementary subtractive combining means is reciprocally in harmony with the solution to the simultaneous equations defining said additive diluting schedule.

9. Apparatus according to claim 4 wherein said color television system is of the three primary color channel variety utilizing green, red, and blue color channels each carrying video signals having an amplitude representable by the symbols G, R and B, and wherein the additive diluting schedule is expressable by the following equations:

$$G_d = G$$
$$R_d = K_1 R + K_1 G$$
$$B_d = K_2 B + K_2 R + K_2 G$$

where $G_d$, $R_d$, and $B_d$ respectively represent signal conditions of each diluted color channel and $K_1$ and $K_2$ are proportionality constants.

10. Apparatus according to claim 9 wherein said complementary subtractive combining means comprises means for communicating the channel signal $G_d$ directly to the green reproducing color channel $G_r$ whereby $$G_r = G_d$$

means for communicating the channel signal $R_d$, said means terminating in a subtractive signal mixer, means for applying the reproducing channel signal $G_r$ to said subtractive mixer whereby to produce at the output reproducing color channel $R_r$ such that $$R_r = \frac{R_d - K_1 G_d}{K_1}$$

and means for communicating the signal channel $B_d$, said means terminating in a subtractive signal mixer and means for applying to said subtractive mixer intelligence channel information $R_d$ for subtraction from $B_d$ whereby to form at the output of said subtractive mixer the blue reproducing channel signal $B_r$.

11. In a time division multiplexed color television radio receiver adapted to receive and demodulate a composite signal including a synchronizing component and a color component, said color component comprising a series of grouped pulses having low and high frequency components, the amplitude variations of each of the separate pulses constituting a group corresponding to intensity variations of a different one of a predetermined number of image color components, the timing of said pulses being reflected in the nature of said synchronizing component, the combination comprising, a supply terminal bearing demodulated color signal, a signal distributing apparatus having an input path connected with said color signal supply terminal and a plurality of output paths equal in number to the number of pulses in each pulse group of the composite signal color component, said distributing apparatus being adapted to periodically and sequentially execute switching of its input path to all of its output paths in accordance with demodulated composite signal synchronizing component whereby signal variations at a given output path represents corresponding intensity variation of a given image color component, a separate color signal channel connected with each of the output paths of said signal distributing apparatus, each channel being restricted in bandwidth to pass only low frequency signal components, means for extracting predetermined amplitudes of signal intelligence from at least one color channel to form impregnating signals, means for mixing, according to a fixed schedule, discrete levels of impregnating signals into at least one color signal other than the one from which said impregnating signals have been derived, a high pass filter circuit having its input connected with said supply terminal, a signal combining circuit having its input paths connected with both the output of at least one of said color signal channels and the output of said high pass filter circuit for combining the signals therefrom, and means for applying the combined signal of said signal combining circuit to the input of a beam intensity modulating circuit for a cathode ray image reproducing tube.

12. In an electrical system the combination of a source of intelligence signal divisible into high and low frequency components, a plurality of signal channels each adapted to communicate predetermined low frequency signal components and discriminate against predetermined high frequency signal components, a signal distributing apparatus having an input terminal and a separate output terminal for each of said signal channels, said signal distributing apparatus being adapted to periodically and sequentially channel its input terminal signal to all of said separate output terminals, coupling between each of said signal distributing apparatus output terminals and the input of a respectively different one of said signal channels, means for mixing signal information from one signal channel with signal information passing through at least one other signal channel, frequency discriminative means connected with said intelligence signal source for extracting and passing the high frequency components therefrom, a plurality of signal adding circuits each having a plurality of inputs and at least one output, connections applying the output of at least one of said signal channels to one of the inputs of a respective signal adding circuit, and connections applying the output of said frequency discriminative means with another input of at least some of said signal adding circuits.

13. In a color television receiver adapted to receive and demodulate a composite time division multiplex signal comprising a series of grouped pulses, the amplitude variations of each of the separate pulses constituting a given group corresponding to signal variations of a different one of a predetermined number of transmitter color information channels at least one of which color information channels being a diluted color channel such that it contains signal variations representing intensity variations of a plurality of a discrete number of image color components, the combination comprising, means for time multiplex distribution of the received multiplex signal to a plurality of receiver color information channels respectively corresponding to said transmitter color information channels whereby at least one of said receiver channels is a diluted color channel corresponding to said transmitter diluted channel, means for extracting predetermined amplitudes of signal intelligence from at least one of said receiver channels other than said diluted receiver channel but containing signal variations corresponding to color components of said diluted channel, and means for subtractively combining said extracted signal intelligence with signal in said receiver diluted channel whereby signals from said diluted channel are intensified to more faithfully represent a single one of the color components comprising the transmitter diluted channel.

14. In a color television receiver adapted to receive and demodulate a composite time division multiplex signal comprising a series of grouped pulses, the amplitude variations of each of the separate pulses constituting a given group corresponding to signal variations of a different one of a predetermined number of transmitter color information channels, a plurality of which color channels being diluted such that each contains signal variations representing intensity variations of a plurality of a discrete number of image color components, the combination comprising means for time multiplex distribution of the received multiplex signal to a plurality of receiver color information channels respectively corresponding to said transmitter color information channels whereby a plurality of said receiver channels are diluted channels corresponding to said transmitter diluted channels, means for extracting predetermined amplitudes of signal intelligence from a plurality of said receiver channels to form an intensifying signal, and means for subtractively combining said intensifying signal with signals in a plurality of said receiver diluted channels whereby signals from said receiver diluted channels are intensified to more faithfully represent a single one of the color components comprising the transmitter diluted signals.

15. Apparatus according to claim 14 wherein said composite time division multiplex signal is based upon three primary image color components Green, Red, and Blue, the amplitudes of whose corresponding intensity signal variations are expressable by the symbols G, R, and B, and where dilution of transmitter color channels complies with the simultaneous equations:

$$G_d=G+K(G+R+B)$$
$$R_d=R+K(G+R+B)$$
$$B_d=B+K(G+R+B)$$

where $G_d$, $R_d$, and $B_d$ respectively represent signal conditions of each color channel when diluted and K is some proportionality constant, and wherein said extracting means is adapted to extract signal intelligence from all of said receiver channels to form said intensifying signal and wherein said subtractive combining means acts to subtract $$\frac{K}{1+3K}$$

times the amplitude of said intensifying signal from each diluted receiver color channel.

16. Apparatus according to claim 14 wherein said composite time division multiplex signal is based upon three primary image color components Green, Red, and Blue, the amplitudes of whose corresponding intensity signal variations are expressable by the symbols G, R, and B, and where dilution of transmitter color channels complies with the simultaneous equations:

$$D_d=G$$
$$R_d=K_1R+K_1G$$
$$B_d=K_2B+K_2R+K_2G$$

where $G_d$, $R_d$, and $B_d$ respectively represent signal conditions of each color channel when diluted and $K_1$ and $K_2$ are proportionality constants, and wherein said extracting means for communicating directly the green receiver channel $G_d$, $R_d$, and $B_d$, and wherein said subtractive signal mixer is a terminus for the Red and Blue receiver channels with connections for subtractively combining $R_d$ signals with $G_d$ signals and $R_d$ signals with $B_d$ signals.

17. Apparatus according to claim 4 wherein said color television system is of the three primary color channel variety utilizing green, red, and blue color channels each carrying video signals having an amplitude representable by the symbols G, R and B, and wherein the additive diluting schedule is expressable by the following equations:

$$G_d=G$$
$$R_d=K_1R+K_1G$$
$$B_d=K_2B+K_2R+K_2G$$

where $G_d$, $R_d$, and $B_d$ respectively represent signal conditions of each diluted color channel and $K_1$ and $K_2$ are proportionality constants, and wherein $K_1$ is made greater than $K_2$, whereby a larger percentage of signal intelligence in said composite signal is representative of green image color components.

18. In an electrical system the combination of a source of intelligence signal divisible into high and low frequency components, a plurality of signal channels each adapted to communicate predetermined low frequency signal components and discriminate against predetermined high frequency signal components, a signal distributing apparatus having an input terminal and a separate output terminal for each of said signal channels, said signal distributing apparatus being adapted to periodically and sequentially channel its input terminal signal to all of said separate output terminals, coupling between each of said signal distributing apparatus output terminals and the input of a respectively different one of said signal channels, means for mixing signal information from one signal channel with signal information passing through at least one other signal channel, frequency discriminative means connected with said intelligence signal source for extracting and passing the high frequency components therefrom, at least one signal adding circuit having a plurality of inputs and at least one output, connections applying the output of at least one of said signal channels to one of the inputs of a respective signal adding circuit, and connections applying the output of said frequency discriminative means with another input of at least some of said signal adding circuits.

ALDA V. BEDFORD.

References Cited in the file of this patent

UNITED STATES PATENTS

| Number | Name | Date |
|---|---|---|
| 1,742,543 | Ives | Jan. 7, 1930 |
| 2,286,730 | Hall | June 16, 1942 |
| 2,316,581 | Hardy | Apr. 13, 1943 |
| 2,335,180 | Goldsmith | Nov. 23, 1943 |
| 2,375,966 | Valensi | May 15, 1945 |
| 2,389,645 | Sleeper | Nov. 27, 1945 |
| 2,423,769 | Goldsmith | July 8, 1947 |
| 2,434,561 | Hardy | Jan. 13, 1948 |
| 2,543,772 | Goldmark | Mar. 6, 1951 |
| 2,552,386 | Sziklai et al. | May 8, 1951 |
| 2,559,843 | Bedford | July 10, 1951 |
| 2,566,693 | Cherry | Sept. 4, 1951 |
| 2,566,707 | Sziklai | Sept. 4, 1951 |